Sept. 12, 1967 E. W. GRANT 3,341,769
CIRCUIT FOR CONTROLLING THE FIRING ANGLE OF A SEMICONDUCTOR
A.C. CURRENT-CONTROLLING DEVICE
Filed March 11, 1963 3 Sheets-Sheet 2
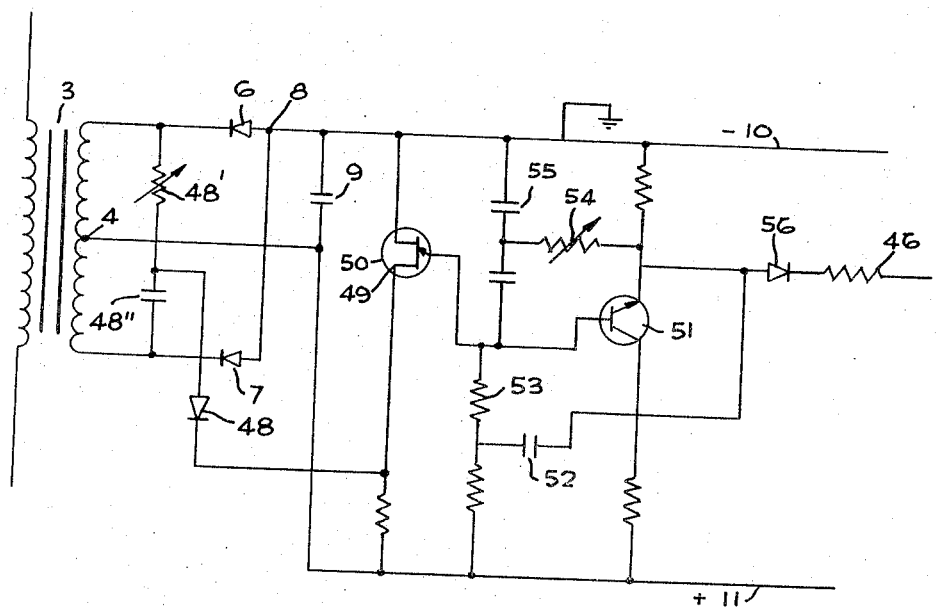
_Fig. 2_
EARL W. GRANT
INVENTOR.
BY
ATTORNEY

EARL W. GRANT
INVENTOR.

United States Patent Office 3,341,769
Patented Sept. 12, 1967

3,341,769
CIRCUIT FOR CONTROLLING THE FIRING ANGLE OF A SEMICONDUCTOR A.C. CURRENT-CONTROLLING DEVICE
Earl W. Grant, Los Angeles, Calif., assignor to Statham Instruments, Inc., Los Angeles, Calif., a corporation of California
Filed Mar. 11, 1963, Ser. No. 264,414
11 Claims. (Cl. 323—22)

This invention relates to circuits for controlling the firing angle of a semiconductor A.C. current-controlling device in order to control the fraction of the applied A.C. current which is conducted by the device.

As is well known, current-control devices such as solid-state semiconductor devices, for example, the silicon-controlled rectifier (SCR) and gas thyraton, herein also referred to as current regulators, have been used for this purpose. The amount of current passed per cycle of the controlled A.C. is determined by controlling the time in the cycle (the phase angle) of the controlled current at which the semiconductor device is conductive, i.e., to fire, termed the "firing angle." This firing angle is determined, in the case of the solid-state semiconductive device, by the phase angle of the controlled current at which the breakdown potential of the solid-state device occurs and, in the case of the gas-filled thyratron, it is the phase angle at which the ionization potential of the gas occurs. These are termed the firing potential of the current-control devices.

In all such devices of the prior art known to applicant, this firing angle is controlled by controlling the phase angle of the voltage applied to the gate of the SCR or to the grid of the thyratron, in relationship to the phase angle of the controlled current. In the case of the thyratron, this is accomplished by applying an A.C. potential to the grid, having the proper phase relationship to the anode potential to give the desired firing angle control. In the case of the SCR, this is accomplished by applying a pulse at the gate having a repetition rate and phase relationship to the anode potential of the SCR to raise the voltage at the gate to the breakdown potential at the desired phase angle of the positive half cycle of the controlled current. This requires the establishment of a phase angle of the grid voltage, accurately controlled with respect to the phase of the controlled current; and in the case of the solid state device (SCR), the pulse rate and the phase relationship of the pulse rate must be accurately controlled with respect to the phase angle of the control current at which firing is desired.

In the system of my invention, I employ a pulse applied to the gate or grid, which pulse has a peak potential sufficient to fire the current control device, timed to be applied at the desired phase angle of the current which is controlled. I generate a train of high frequency pulses, i.e., with a very high repetition rate compared to the period of the wave of the controlled current, and initiate the train at the desired phase angle of the controlled current.

A suitable form of pulse generator is a relaxation oscillator employing an RC circuit. The charging current and charging rate applied to the condenser of the RC circuit are related to the current being controlled, so that oscillation of the relaxation oscillator is initiated, and thus the pulse train is initiated at the seelcted phase angle of the controlled current. This pulse initiation is obtained by applying an A.C. potential which modulates a D.C. bias potential to the relaxation oscillator sufficient to initiate oscillations. The phase angle of the applied A.C. is related to the D.C. bias so that the pulse train is initiated at the desired firing angle of the current-control device.

In my preferred embodiment, I use a unijunction transistor connected with an RC circuit to form a relaxation oscillator, and connect a junction transistor connected in common emitter configuration so that the emitter-collector circuit is in series with the capacitance of the RC circuit, with the collector of the junction transistor coupled to the emitter of the unijunction transistor. An A.C. voltage is applied to the said emitter.

An A.C. voltage, whose peak value is by itself insufficient to produce a forward bias in the unijunction transistor, i.e., the firing potential of the unijunction transistor, is applied to the emitter of the unijunction transistor.

A D.C. bias is also applied to the emitter of the unijunction transistor. This D.C. bias is by itself also below the firing potential of the unijunction transistor. By adjusting the phase of the applied A.C. and the D.C. bias, the emitter may be raised to the potential to produce a forward bias in the unijunction transistor, i.e., to fire the unijunction transistor and initiate the pulse train.

By adjusting the phase of the AC applied to the emitter in relation to the phase of the line current to be controlled by the current-control device, the phase angle of the controlled line current at which pulses are initiated may be controlled. Since the arrival of the pulse fires the current-control device, this will determine the firing angle of the current-control device.

When no signal is applied to the base of the junction transistor, or an insufficient signal is applied, an insufficient bias is applied to the AC to raise the instantaneous value of the AC to the firing point of the current-control device. When a sufficient DC bias is established at the emitter of the unijunction transistor, which, added to the instantaneous value of the applied AC, is sufficient to raise the emitter potential of the unijunctional transistor to that required to forward bias the unijunction transistor, i.e., to fire the unijunction transistor, a pulse train is initiated.

The phase angle of the controlled AC at which this firing potential of the unijunction transistor will occur depends on the phase relation between the applied AC and the initiative of pulse generation and the DC bias. For any given AC source, this will depend on the magnitude of the DC bias.

The train of pulses will be initiated when the instantaneous value of the voltage of the modulating AC biased by the collector voltage is sufficient to establish the emitter potential at the unijunction transistor to forward bias the unijunction transistor; and the pulse train will continue until the instantaneous value of the voltage in the modulating AC falls below the level at which the pulse train can be maintained, that is, until the emitter potential falls below the forward biasing potential of the unijunction transistor.

The duration of the pulses and the phase angle of the modulating AC, at which the pulse train is initiated, thus depend upon the signal level at the base of the junction transistor. Thus, the higher the DC level, the greater is the phase angle of the modulating AC wave at which the unijunction transistor becomes forward biased. However, since the pulse repetition rate is but moderately affected by the collector-to-emitter impedance, when the junction transistor is conductive, the level of the signal at the base of the junction transistor has but an insubstantial effect upon the repetition rate of the pulses generated at the base of the unijunction transistor, or the pulse amplitude.

I may now employ this triggered relaxation oscillator to control the firing angle of a semiconductor regulator, such as a silicon-controlled rectifier (SCR) or a thyratron, by adjusting the phase of the modulating AC to the phase of the current controlled by the regulator. There will thus be an instantaneous value at some phase angle of the modulating AC at which a pulse is generated at the gate of the SCR or the grid of the thyratron to raise the gate potential to the breakdown potential of the SCR or the grid potential to the ionization potential of the thyratron. Thus, if the phase of the modulating AC is fixed in relation to that of the current to be controlled, this will establish the firing angle of the controlled current.

By fixing the RMS value of the modulating AC and its phase relationship to the controlled current such that the DC-biased instantaneous value of the modulating AC existing at a predetermined level of the signal at the base of the junction transistor is sufficient to forward bias the unijunction transistor at the desired value of the phase angle of the modulating AC, which in turn has a controlled relation to the phase of the current controlled by the current-controlling device, the firing angle of the device may be fixed to give the desired quantity of current flow through the device. The quantity of the current flow will be proportional to the signal level at the base of the junction transistor.

This regulation is particularly useful in controls where the quantity of current is required to be related to the magnitude of a condition. By arranging circuitry such that the base potential of the junction transistor is made proportional to the magnitude of the condition, the quantity of current flow per unit of time may be made proportional to such condition.

Thus, if the base potential is made proportional to the voltage unbalance of a Wheatstone bridge, which is applied to the base of the junction transistor, the quantity of current flow per unit of time may be made responsive to the condition.

This unbalance is caused by a change in thet impedances of the bridge, such as a resistance, capacitance or inductance Wheatstone bridge. A good example is a resistance bridge. Such bridges employ resistors whose resistance is varied by a variation in the force or temperature; for example, employing strain wire gages of either the bonded or unbonded type, such as pressure gages or accelerometers. Such gages are well known in the art.

The power delivered by the regulator may be made proportional to the pressure or acceleration. By making one or more of the resistances of the bridge temperature-sensitive, as, for example, in thermometric systems, the power delivered may be made proportional to the temperature in the ambient environment to which the temperature-sensitive resistor is exposed.

This invention will be further described by reference to the drawings, which show a preferred embodiment of my invention, in which:

FIG. 2 shows a modification of said circuit; and

Figure 1:
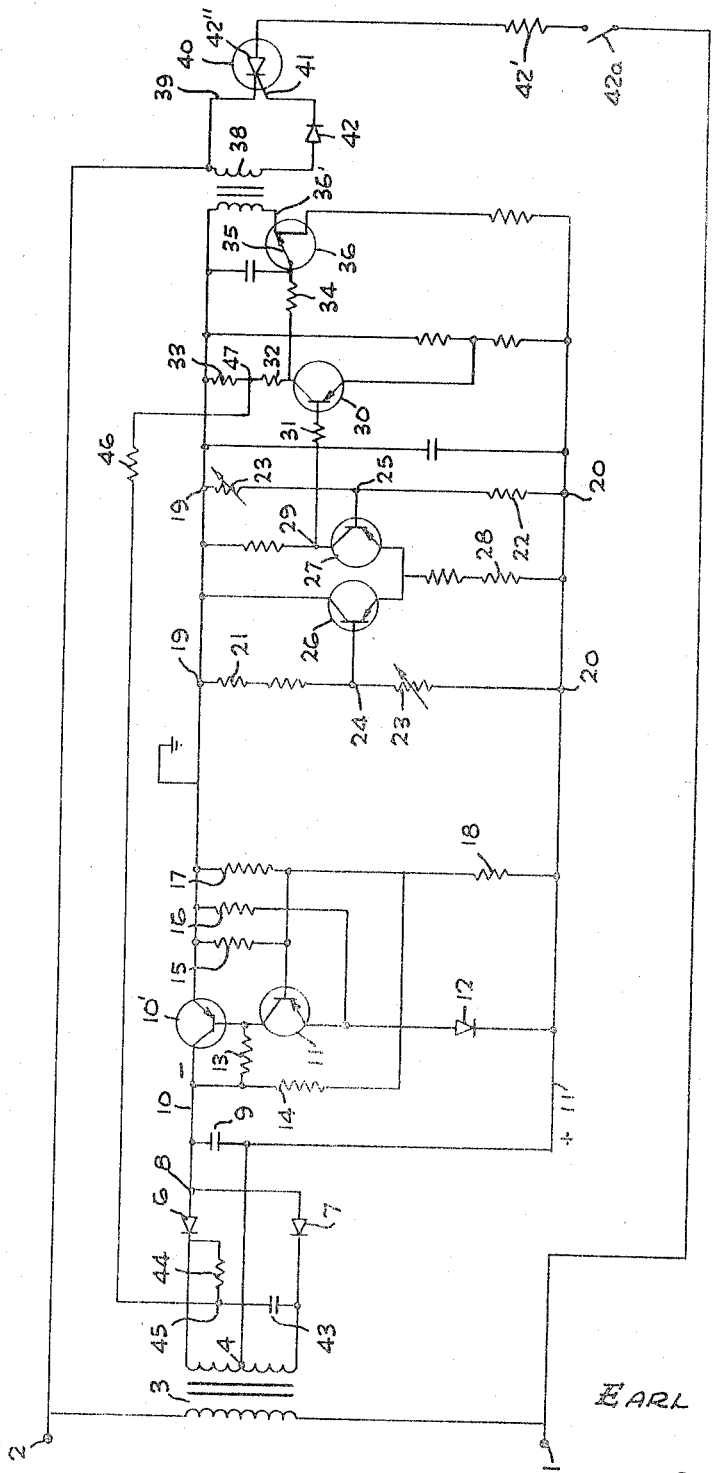
FIG. 1 is a schematic circuit diagram showing one form of my invention.

FIG. 1 shows a system employing a solid state regulator in the form of a silicon-controlled regulator (SCR), a pulse generator in the form of a relaxation oscillator employing a unijunction transistor, an amplifier to generate the DC bias, a signal generator in the form of a Wheatstone bridge whose unbalance is amplified to generate the DC bias, a series voltage regulator to energize the bridge, amplifier and relaxation oscillators, and a current source applied to the SCR and also applied to the emitter of the unijunction transistor through a phase-shifting RC delay network.

The AC line voltage to be regulated by the SCR is applied at 1 and 2 to the primary of the transformer 3. The transformer is tapped at 4 and connected to the rectifying diodes 6 and 7. The AC voltage across 9 is substantially lower than across 1 and 2. The ground line 10 is negative with respect to line 11. The voltage at 8 is regulated by a series regulator composed of the power-regulating transistor 10' and preamplifying transistor 11 and zener diode 12, acting as a voltage reference. Suitable biasing and load resistors are provided, to wit, 13, 14, 15, 16, 17 and 18. The rectified and regulated voltage is applied to the input corners 19 and 20 of a Wheatstone bridge. The opposite legs of the Wheatstone bridge are condition-sensitive resistor 21 and condition-insensitive resistor 22, and the adjacent legs are composed of variable resistors 23. The output corners of the bridge are at 24 and 25.

The bridge is balanced or unbalanced to the desired degree by adjustment of resistors 23.

The output of the bridge is connected to the input of a differential DC amplifier connected single ended. The output corners are connected to the bases of junction transistors 26 and 27, with the emitters connected in common mode through load resistor 28.

The single-ended output at 29 is connected to the base of a junction transistor 30, through a dropping resistor 31. The collector of 30 is connected through a voltage divider, whose lower leg is a resistor 32 and whose upper leg 33 is connected to the negative line 10. The collector of 30 is connected through a resistor 34 to the emitter 35 of the unijunction transistor 36. The grounded base 36' (base 1 of the unijunction transistor) is connected through the primary of the transformer 37 to ground line 10. The secondary 38 of the transformer is connected to cathode 39 of the SCR 40, and the secondary 38 is connected also to the gate 41 of the SCR through the diode 42. The anode of the SCR is connected to the line voltage at 1 through resistor 42' and switch 42a, and the cathode 39 is also connected to the line voltage at 2.

A phase shifted AC of the frequency of the current at 1 and 2 is obtained by means of the RC circuit composed of resistor 44 and condenser 43, in series, shunted across the secondary of the transformer, and the midpoint 45 of the RC network is connected through resistance 46 to the midpoint 47 between the voltage divider legs 33 and 32.

With the switch 42a closed, AC line voltage is applied between the anode 42" and cathode 39 of the SCR 40. Unless the breakdown potential of the SCR is applied at the gate 41, the current is blocked in 40 and no current passes through the resistor 42'.

The firing gate voltage is obtained as follows. The delay circuit, composed of condenser 43 and resistor 44, shifts the phase of the voltage at 45 to 90° delay to the phase of the voltage at 1 and 2. The RMS value of the voltage at 45 is designed so that it is substantially below that required to forward bias the unijunction transistor 36.

This required emitter potential at 35 is obtained by superimposing a DC bias at the emitter 35 by means of the collector potential of the junction transistor 30. The single ended output 29 of the differential amplifier, amplified by the transistor 30, is also insufficient by itself to establish at the emitter 35 of the unijunction transistor, in the absence of the voltage through 46, the required forward biasing potential at the emitter 35. Additionally, it may also, when the bridge is in balance with substantially no voltage difference between 24 and 25, be just sufficient, when added to the instantaneous value of the AC signal at 47, occurring at any selected phase angle of the AC signal, to place the unijunction transistor 36 in the forward biased condition and thus to initiate the pulse generation.

The phase angle of the AC signal at which this occurs will depend on the magnitude of the AC bias established at the collector 32, and thus at the emitter 35 of the unijunction transistor.

Figure 3:
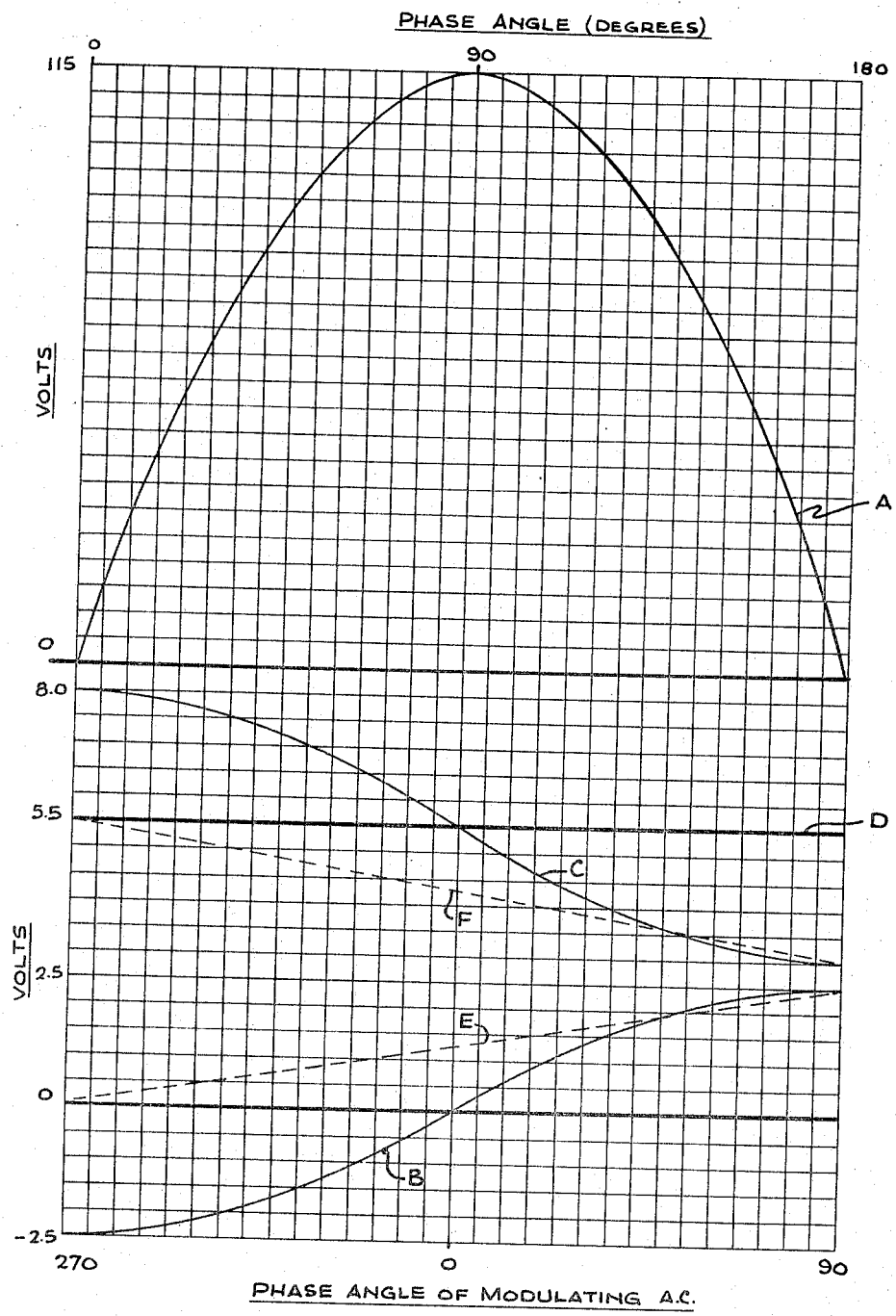
FIG. 3 shows curves illustrating the principles of my invention.

This is illustrated in FIG. 3. In FIG. 3, A is the positive half of the line voltage to be regulated, shown for illustrative purposes as sinusoidal, and taken at an arbitrarily chosen ordinate. B is applied AC, also shown as sinusoidal and 90° lagging to that of the line voltage. The peak value of the applied AC is much less than the potential which must be established at the collector 35 of the unijunction transistor, i.e., the firing potential shown in line D. Line D shows the value of the DC bias which is established at the said emitter by the collector of the junction transistor 30, so that the sum of the DC bias potential, when added to some instantaneous value of the applied AC, shall equal the above firing potential.

Thus, for purposes of illustration, the applied AC is shown sinusoidal and displaced 90° from the sinusoidal line voltage. It is shown as peaking at 2.5 volts. The firing voltage at the emitter is shown as 5.5 volts. Thus, if the unijunction transistor is required to start its pulse generation at 270° of the phase angle, the DC bias must be 8.0 volts. If the firing point is to start at 0° of the phase angle of the applied AC, the DC bias must be 5.5 volts. If this is to occur at almost 90° of the phase angle, then the DC bias must be almost 3 volts.

Thus it will be seen that, by changing the DC bias, the pulse initiation may be made to occur at any selected phase angle of the applied AC.

Since the SCR is fired at the arrival of the pulse train from the unijunction transistor, the SCR will fire as soon as the DC bias has raised the emitter potential of the unijunction transistor to the firing point of the unijunction transistor. Since the phase of the modulating AC voltage bears a fixed relation to the phase of the line voltage which is to be controlled by the SCR, this will determine the phase angle of the current to be controlled at which the SCR fires.

Thus, by reference to FIG. 3, assume that the unijunction transistor becomes forward biased at 5.5 volts at its emitter. With a DC bias at 8.0 volts, the firing potential occurs at 270° of the phase angle of the modulating AC (see curves B and C and line D). If the pulses are initiated at 270° phase angle of the applied modulating AC, this is equivalent to 0° phase angle of the line voltage (see curve A). The SCR fires thus at 0° phase angle and is conductive throughout the entire half cycle, and shuts off when the line voltage approaches at substantially 180° phase angle. If the DC bias is only 5.5 volts, the unijunction transistor will not fire unless the positive half of the applied modulating current is applied, and will do so at 0° phase angle of the modulating AC (curve B). This corresponds to the 90° phase angle of the line voltage. Thus, the SCR is conductive during the entire period of the phase angles from 90° to about 180° and then shuts off. This occurs irrespective of the nature of the pulse generation during the conductive portion of the phase angle.

The repetition rate of the pulses is sufficiently greater than the frequency of the controlled current so that the phase angle interval of the controlled current during which the pulse rises to the firing potential is minimized. Thus, for example, the pulse rate may be from 10 to 100 times the frequency of the controlled current. Thus, as an illustrative example, if the controlled current is 50 cycles per second, the repetition rate may be about 2000 pulses per second.

By applying biasing DC voltages of less than 5.5 but more than 3 volts to the emitter of the unijunction transistor, under the conditions assumed for FIG. 3, the firing point may be shifted closer to the 180° point of the controlled AC line voltage.

The DC bias comes from the amplifier, including the junction transistor 30. The signal amplified comes from the unbalance of the bridge. Thus, with linear amplifications, the firing phase angle of the SCR may be made a function of the bridge unbalance.

Thus, assume the bridge is unbalanced by adjusting the resistor 23, and the potential at the collector of 30 establishes a DC bias at the emitter of 36 equal to 8 volts. The potential at the emitter 35 will not reach the firing potential of the unijunction transistor until the AC applied at 47 establishes its negative peak potential at 270° of its phase angle and zero phase angle of the line voltage, and current passes through the SCR and the resistor 42′. Thus, if the resistor is a heating unit, heat will be applied to the ambient space in which it is positioned.

Assume now that the resistor 21 is temperature-sensitive and its resistance increases as the temperature rises in the ambient space. The unbalance of the bridge becomes less, and the voltage at 29 decreases, and thus the potential at the collector of 30 decreases, reducing the DC bias at 35. Assume that the new bias is 5.5 volts. The total positive potential at 35 will not occur until 0° phase angle of the applied modulating potential. Thus, the pulse train starts at 0° phase angle of the applied AC, that is, 90° of the line AC. The duration of the current is thus for one-half of the positive half cycle of the line voltage.

Assume that, as temperature keeps rising due to current passing through 42′, and the resistance of resistor 21 rises, the unbalance decreases further, the DC bias at 35 falling. This shifts the firing angle to lower values of the phase angle of the line voltage. This reduces further the amount of current through the heater per unit of time, decreasing as the temperature rises, until the resistance of 31 brings the bridge to balance to establish a DC bias of 3 volts, thus shifting the firing angle to 90° phase angle of the line voltage, shutting off the current.

Instead of using a sinusoidal, phase-displaced AC to modulate the DC potential established at 47, I may employ a sawtooth wave in phase with the controlled line voltage. Such a sawtooth oscillator is illustrated in FIG. 2. The rectified AC at the diode 48, connected to the variable RC circuit composed of variable resistor 48′ and condenser 48″, passes negative pulses to the base 49 of the unijunction transistor 50. The output amplifying NPN transistor 51 buffers the output, with the capacitor 52 and resistor 53 acting to improve the linearity of the sawtooth wave. Variable resistor 54 and capacitor 55 provide an integrating feedback to compensate for the loading of the output transistor 51. Optimum linearity of the sawtooth output at 42 is obtained by adjusting the resistor 54. The output 56 is connected through the resistor 46 to 47 of FIG. 1. The sinusoidal phase displaced AC from 45 is not employed when the modulating sawtooth wave from 56 is employed. The adjustment of the resistor 48′ will shift the sawtooth wave into coincidental in-phase relationship with the controlled current.

Referring to FIG. 3, the relaxation oscillator of FIG. 2 will generate a positive sawtooth pulse synchronous with the negative pulse excitation from 48. The rise time of the sawtooth pulse is illustrated at line D, rising from 0 to 2.5 volts at the emitter 35 of the unijunction transistor 30 of FIG. 1, as the negative pulse moves through 180° to 360° of its phase angle of the synchronous excitation frequency through 48. The AC bias at the emitter 35 is established as previously, to raise the instantaneous potential to the firing point. Line E illustrates the instantaneous potentials of the positive half of the sawtooth wave. Line F gives the DC bias. It will be seen that the firing angle of the SCR is thus closer to a linear function of the DC bias across the entire 180° of the positive half cycle of the controlled current.

While I have described particular embodiments of my invention for the purpose of illustration, it should be understood that various modifications and adaptations thereof may be made, within the spirit of my invention, as set forth in the appended claims.

I claim:

1. A firing angle control circuit for a semiconductor current-regulating device, comprising a semiconductor having an anode and a cathode and an electrode for establishing the firing potential of said semiconductor device, means to apply an alternating current to be regulated to said anode, a pulse generator, means to apply said pulse to said electrode, said pulses having a peak potential at least as high as the said firing potential, and means to initiate said pulses at a selected phase angle of said regulated AC, said pulse generator being a relaxation oscillator including an RC circuit, a unijunction transistor, said unijunction transistor including an emitter, said RC circuit coupled to said emitter, means for applying a DC bias to the said emitter, means to apply an AC potential to the said emitter to modulate the said DC bias, said modulating AC having a selected phase relationship to said regulated AC, said DC bias being, in the absence of said AC potential, insufficient to bias the unijunction transistor in a forward direction, the peak value of said AC potential being, in the absence of said DC bias, insufficient to bias the unijunction transistor in a forward direction, said modulated DC being sufficient at a selected phase angle of said modulating AC and of said regulated AC to forward bias said unijunction transistor, to initiate said pulses at said selected phase angle of said regulated AC, an amplifying junction transistor, said emitter of said unijunction transistor being coupled to the collector of said amplifying junction transistor to establish said DC bias at the emitter of said unijunction transistor, and means to apply a DC signal to the base of said unijunction transistor.

2. The circuit of claim 1, said modulating AC having a lagging phase displaced voltage relative to the regulated AC.

3. The circuit of claim 2, a heater resistor in series with the cathode of said regulator, a heated space heated by said heater, a Wheatstone bridge, one of whose legs is a temperature-sensitive resistor in said heated space, the output of said bridge coupled to the base of said junction transistor.

4. The circuit of claim 1, said modulated AC being a sawtooth wave voltage synchronous with said controlled AC.

5. The circuit of claim 4, a heater resistor in series with the cathode of said regulator, a heated space heated by said heater, a Wheatstone bridge, one of whose legs is a temperature-sensitive resistor in said heated space, the output of said bridge coupled to the base of said junction transistor.

6. The circuit of claim 1, a heater resistor in series with the cathode of said regulator, a heated space heated by said heater, a Wheatstone bridge, one of whose legs is a temperature-sensitive resistor in said heated space, the output of said bridge coupled to the base of said junction transistor.

7. A firing angle control circuit for a semiconductor current-regulating device, comprising a semiconductor having an anode and a cathode and an electrode for establishing the firing potential of said semiconductor device, means to apply an alternating current to be regulated to said anode, a pulse generator, means to apply said pulse to said electrode, said pulses having a peak potential at least as high as the said firing potential, and means to initiate said pulses at a selected phase angle of said regulated AC, said pulse generator being a relaxation oscillator including an RC circuit and a unijunction transistor, said unijunction transistor including an emitter, said RC circuit coupled to said emitter; means for applying a DC bias to the said emitter, means to apply an AC potential to the said emitter to modulate the said DC bias, said modulating AC having a selected phase relationship to said regulated AC, said DC bias being, in the absence of said AC potential, insufficient to bias the unijunction transistor in a forward direction, the peak value of said AC potential being, in the absence of said DC bias, insufficient to bias the unijunction transistor in a forward direction, said modulated DC being sufficient at a selected phase angle of said modulating AC and of said regulated AC to forward bias said unijunction transistor, to initiate said pulses at said selected phase angle of said regulated AC, a heater resistor in series with the cathode of said regulator, a heated space heated by said heater, a Wheatstone bridge, one of whose legs is a temperature-sensitive resistor in said heated space, the output of said bridge coupled to said emitter.

8. A firing angle control circuit for a semiconductor current-regulating device, comprising a semiconductor having an anode and a cathode and an electrode for establishing the firing potential of said semiconductor device, means to apply an alternating current to be regulated to said anode, a pulse generator, means to apply said pulse to said electrode, said pulses having a peak potential at least as high as the said firing potential, and means to initiate said pulses at a selected phase angle of said regulated AC, said pulse generator being a relaxation oscillator including an RC circuit and a unijunction transistor, said unijunction transistor including an emitter, said RC circuit coupled to said emitter, means for applying a DC bias to the said emitter, means to apply an AC potential to the said emitter to modulate the said DC bias, said modulating AC having a selected phase relationship to said regulated AC, said DC bias being, in the absence of said AC potential, insufficient to bias the unijunction transistor in a forward direction, the peak value of said AC potential being, in the absence of said DC bias, insufficient to bias the unijunction transistor in a forward direction, said modulated DC being sufficient at a selected phase angle of said modulating AC and of said regulated AC to forward bias said unijunction transistor, to initiate said pulses at said selected phase angle of said regulated AC, said modulating AC having a lagging phase displaced voltage relative to the regulated AC, a heater resistor in series with the cathode of said regulator, a heated space heated by said heater, a Wheatstone bridge, one of whose legs is a temperature-sensitive resistor in said heated space, the output of said bridge coupled to the base of said junction transistor.

9. A firing angle control circuit for a semiconductor current-regulating device, comprising a semiconductor having an anode and a cathode and an electrode for establishing the firing potential of said semiconductor device, means to apply an alternating current to be regulated to said anode, a pulse generator, means to apply said pulse to said electrode, said pulses having a peak potential at least as high as the said firing potential, and means to initiate said pulses at a seleted phase angle of said regulated AC, said pulse generator being a relaxation oscillator including an RC circuit and a unijunction transistor, said unijunction transistor including an emitter, said RC circuit coupled to said emitter, means for applying a DC bias to the said emitter, means to apply an AC potential to the said emitter to modulate the said DC bias, said modulating AC having a selected phase relationship to said regulated AC, said DC bias being, in the absence of said AC potential, insufficient to bias the unijunction transistor in a forward direction, the peak value of said AC potential being, in the absence of said DC bias, insufficient to bias the unijunction transistor in a forward direction, said modulated DC being sufficient at a selected phase angle of said modulating AC and of said regulated AC to forward bias said unijunction transistor, to initiate said pulses at said selected phase angle of said regulated AC, said modulated AC being a sawtooth wave voltage synchronous with said controlled AC, a heater resistor in series with the cathode of said regulator, a heated space heated by said heater, a Wheatstone bridge, one of whose legs is a temperature-sensitive resistor in said heated space, the output of said bridge coupled to the base of said junction transistor.

10. In a current control circuit, the combination comprising: a unilateral conductive device having an anode, a cathode and a control electrode; first means for connecting a source of an alternating input voltage across said anode and cathode; a second means responsive to said input voltage for producing a first alternating control signal lagging said input voltage by a predetermined phase angle no greater than 90 degrees; third means for selectively varying the magnitude of said first control signal to provide a second control signal; and fourth means responsive to said second control signal for applying a firing signal between said cathode and said control electrode at a predetermined time during the cycle of said input voltage corresponding to said first control signal variation, said fourth means including a relaxation oscillator having a unijunction transistor, said oscillator being connected to supply firing pulses between the cathode and control electrode of said unilateral conductive device, said third means including a heater resistor connected in series with the cathode of said unilateral conductive device, and a Wheatstone bridge having a temperature sensitive resistor in one leg thereof, the output of said bridge being coupled to said fourth means.

11. In a current control circuit, the combination comprising: a unilateral conductive device having an anode, a cathode and a control electrode; first means for connecting a source of an alternating input voltage across said anode and cathode; second means responsive to said input voltage for producing a first alternating control signal lagging said input voltage by a predetermined phase angle no greater than 90 degrees; third means for selectively varying the magnitude of said first control signal to provide a second control signal; and fourth means responsive to said second control signal for applying a firing signal between said cathode and said control electrode at a predetermnied time during the cycle of said input voltage corresponding to said first control signal variation, said third means including a heater resistor connected in series with the cathode of said unilateral conductive device, and a Wheatstone bridge having a temperature sensitive resistor in one leg thereof, the output of said bridge being coupled to said fourth means.

References Cited

UNITED STATES PATENTS

| | | | |
|---|---|---|---|
| 3,128,422 | 4/1964 | Brown | 323—122 X |
| 3,136,877 | 6/1964 | Heller | 307—88.5 |
| 3,158,799 | 11/1964 | Kelly et al. | |
| 3,159,737 | 12/1964 | Dora. | |
| 3,175,077 | 3/1965 | Fox et al. | |
| 3,176,212 | 3/1965 | De Puy. | |
| 3,226,627 | 12/1965 | Fromkin. | |

OTHER REFERENCES

Notes on the application of the Silicon Controlled Rectifier, General Electric, December 1958.

JOHN F. COUCH, *Primary Examiner.*

M. O. HIRSHFIELD, *Examiner.*

O. L. RADER, W. M. SHOOP, *Assistant Examiners.*